United States Patent
Shibaike et al.

(10) Patent No.: US 12,477,527 B2
(45) Date of Patent: Nov. 18, 2025

(54) TERMINAL, BASE STATION AND COMMUNICATION METHOD

(71) Applicant: NTT DOCOMO, INC., Tokyo (JP)

(72) Inventors: Naoya Shibaike, Tokyo (JP); Mayuko Okano, Tokyo (JP); Hiroki Harada, Tokyo (JP); Jing Wang, Beijing (CN); Qiping Pi, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 347 days.

(21) Appl. No.: 18/258,668

(22) PCT Filed: Jan. 5, 2021

(86) PCT No.: PCT/JP2021/000130
§ 371 (c)(1),
(2) Date: Jun. 21, 2023

(87) PCT Pub. No.: WO2022/149194
PCT Pub. Date: Jul. 14, 2022

(65) Prior Publication Data
US 2024/0049195 A1    Feb. 8, 2024

(51) Int. Cl.
*H04W 72/0446*    (2023.01)
*H04W 48/08*    (2009.01)
*H04W 72/20*    (2023.01)
*H04W 74/0833*    (2024.01)

(52) U.S. Cl.
CPC ....... *H04W 72/0446* (2013.01); *H04W 48/08* (2013.01); *H04W 72/20* (2023.01); *H04W 74/0833* (2013.01)

(58) Field of Classification Search
CPC ..... H04W 16/28; H04W 48/08; H04W 48/12; H04W 48/16; H04W 56/00; H04W 72/0446; H04W 72/20; H04W 74/0833; Y02D 30/70
See application file for complete search history.

(56) References Cited

U.S. PATENT DOCUMENTS

2019/0037509 A1*   1/2019   Li .................... H04W 56/001
2019/0215048 A1*   7/2019   Cirik ................ H04W 56/0045
2019/0306832 A1   10/2019   Si et al.
(Continued)

OTHER PUBLICATIONS

3GPP TS 38.300 V16.3.0; "3rd Generation Partnership Project; Technical Specification Group Radio Access Network; NR; NR and NG-RAN Overall Desription; Stage 2 (Release 16)"; Sep. 2020 (148 pages).
(Continued)

*Primary Examiner* — Thomas R Cairns
(74) *Attorney, Agent, or Firm* — Osha Bergman Watanabe & Burton LLP

(57) ABSTRACT

A terminal includes: a reception unit configured to receive a block including a synchronization signal and a broadcast channel, a control channel carrying control information, and a shared channel carrying system information by applying single beamforming; and a control unit configured to perform an initial access, based on the system information. The block and one or both of the control channel and the shared channel are frequency-multiplexed, and the control channel and the shared channel are time-multiplexed.

5 Claims, 20 Drawing Sheets

(56) References Cited

U.S. PATENT DOCUMENTS

2021/0320832 A1* 10/2021 Xiao ................... H04L 5/005
2024/0031110 A1* 1/2024 Kim .................... H04W 56/00

OTHER PUBLICATIONS

3GPP TS 38.306 V16.2.0; "3rd Generation Partnership Project; Technical Specification Group Radio Access Network; NR; User Equipment (UE) radio access capabilities (Release 16)"; Sep. 2020 (126 pages).
International Search Report issued in corresponding International Application No. PCT/JP2021/000130, mailed on Jul. 6, 2021 (6 pages).
Written Opinion issued in corresponding International Application No. PCT/JP2021/000130, mailed on Jul. 6, 2021 (5 pages).
Nokia et al; "Required changes to NR using existing DL/UL NR waveform"; 3GPP TSG RAN WG1 #103, R1-2007926; e-Meeting; Oct. 26-Nov. 13, 2020 (35 pages).
Office Action issued in Japanese Patent Application No. 2022-573822, mailed on Jan. 28, 2025 (6 pages).

* cited by examiner

TERMINAL, BASE STATION AND COMMUNICATION METHOD

FIELD OF THE INVENTION

The present invention relates to a terminal, a base station, and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

NR release 17 discusses using a higher frequency band than a conventional release (e.g., Non-Patent Document 2). For example, applicable numerologies including subcarrier spacings, channel bandwidths, etc., physical layer design, and possible failures in actual wireless communication in the 52.6 GHz to 71 GHz frequency band have been discussed.

CITATION LIST

Non-Patent Document

[Non-Patent Document 1] 3GPP TS 38.300 V16.3.0 (2020-09)
[Non-Patent Document 2] 3GPP TS 38.306 V16.2.0 (2020-09)

SUMMARY OF THE INVENTION

Technical Problem

It is expected that a larger SCS (Sub-carrier spacing) will be used and a greater number of beams will be used in the frequency band using the higher frequencies to be newly deployed. It is required to arrange synchronization signals, control signals, and system information required for performing initial access to radio resources with the assumption that deployment will be performed in the above-described frequency.

The present invention has been made in view of the foregoing points and enables initial access to be performed in accordance with frequency bands in a wireless communication system.

Solution to Problem

According to the disclosed technique, a terminal is provided. The terminal includes: a reception unit configured to receive a block including a synchronization signal and a broadcast channel, a control channel carrying control information, and a shared channel carrying system information by applying single beamforming; and a control unit configured to perform an initial access, based on the system information. The block and at least one of the control channel and the shared channel are frequency-multiplexed, and the control channel and the shared channel are time-multiplexed.

Advantageous Effects of Invention

According to the disclosed technique, initial access can be performed in accordance with frequency bands in a wireless communication system.

DETAILED DESCRIPTION OF THE PREFERRED EMBODIMENTS

In the following, one or more embodiments of the present invention will be described with reference to the drawings. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

Figure 1:
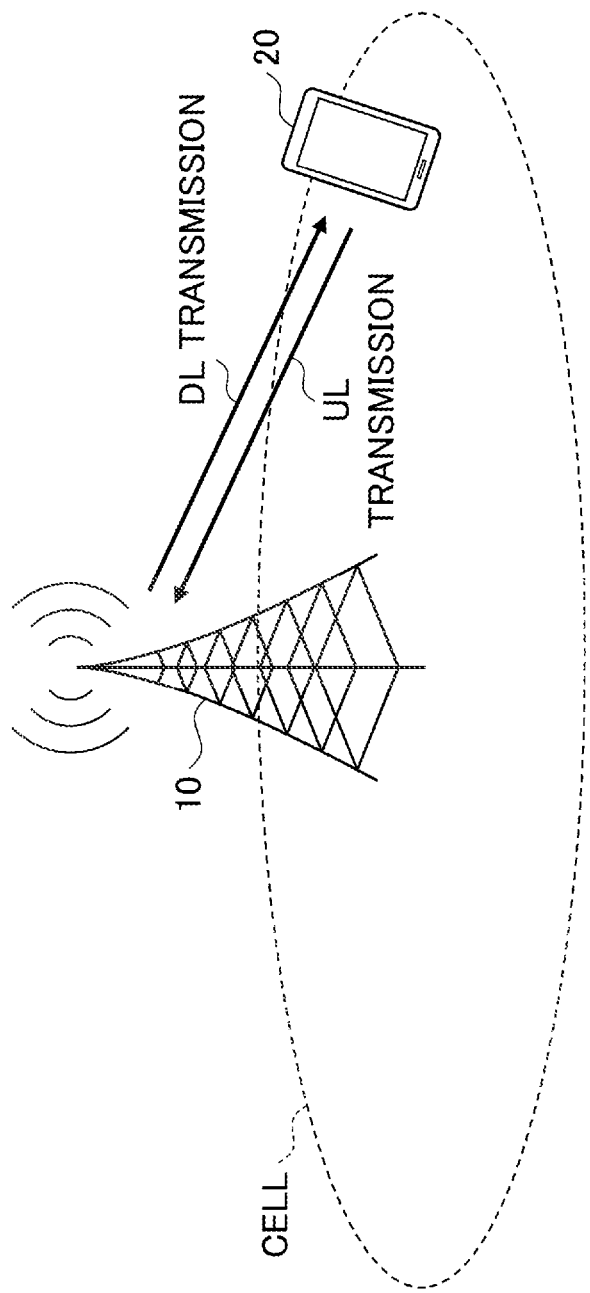
FIG. 1 is a drawing illustrating a configuration example of a wireless communication system according to an embodiment of the present invention.

FIG. 1 is a drawing illustrating a configuration example of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (SCell: Secondary Cell) and a primary cell (PCell: Primary Cell) using CA (Carrier Aggregation). In addition, the terminal 20 may perform communications via a primary cell of the base station 10 and a primary secondary cell group cell (PS Cell: Primary SCG Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals.

Figure 2:
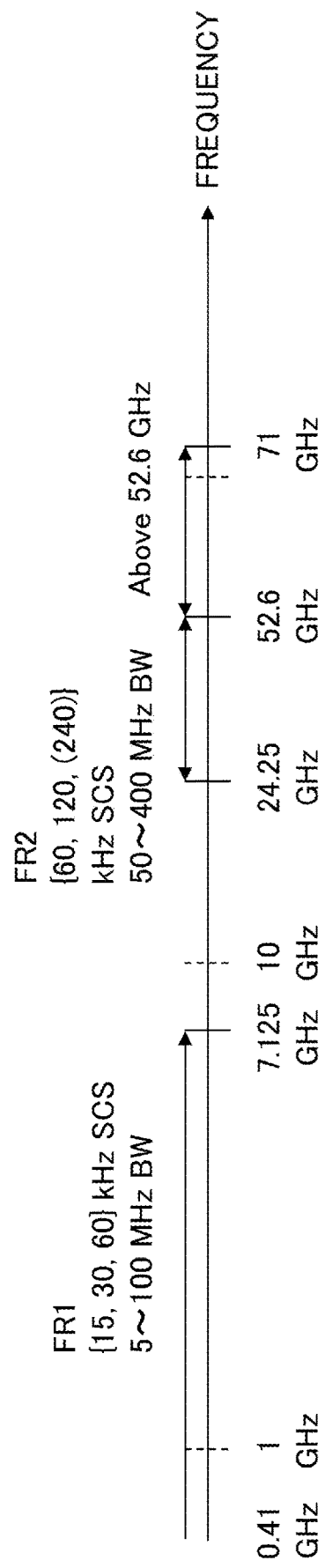
FIG. 2 is a drawing illustrating an example of a frequency range according to an embodiment of the present invention.

FIG. 2 is a drawing illustrating an example of a frequency range according to an embodiment of the present invention. In the NR specifications of 3GPP Release 15 and Release 16, for example, an operation in a frequency band of 52.6 GHz or more has been discussed. Note that, as shown in FIG. 2, FR (Frequency range) 1 in which current operation is defined is a frequency band from 410 MHz to 7.125 GHz, SCS (Sub carrier spacing) is 15, 30, or 60 kHz, and bandwidth is from 5 MHz to 100 MHz. FR2 is a frequency band from 24.25 GHz to 52.6 GHz, SCS is 60, 120, or 240 kHz, and bandwidth is from 50 MHz to 400 MHz. For example, the newly operated frequency band may be assumed to be from 52.6 GHz to 71 GHz.

Up to 64 SSB beams may be supported in the licensed bands and unlicensed bands in the newly deployed frequency band. Also, 120 kHz SCS to be applied to SSB and 120 kHz SCS to be applied to initial access signals and channels, may be supported in the initial BWP (Bandwidth Part). In addition, the SCS applied to SSB may support 240 kHz, 480 kHz, and 960 kHz, and the SCS applied to the signal and channel related to initial access may support 480 kHz and 960 kHz. In addition, in a case other than initial access, 480 kHz SCS and 960 kHz SCS to be applied to SSB may be supported. It should be noted that the coverage enhancement by SSBs is currently not necessarily viewed as important.

Figure 3:
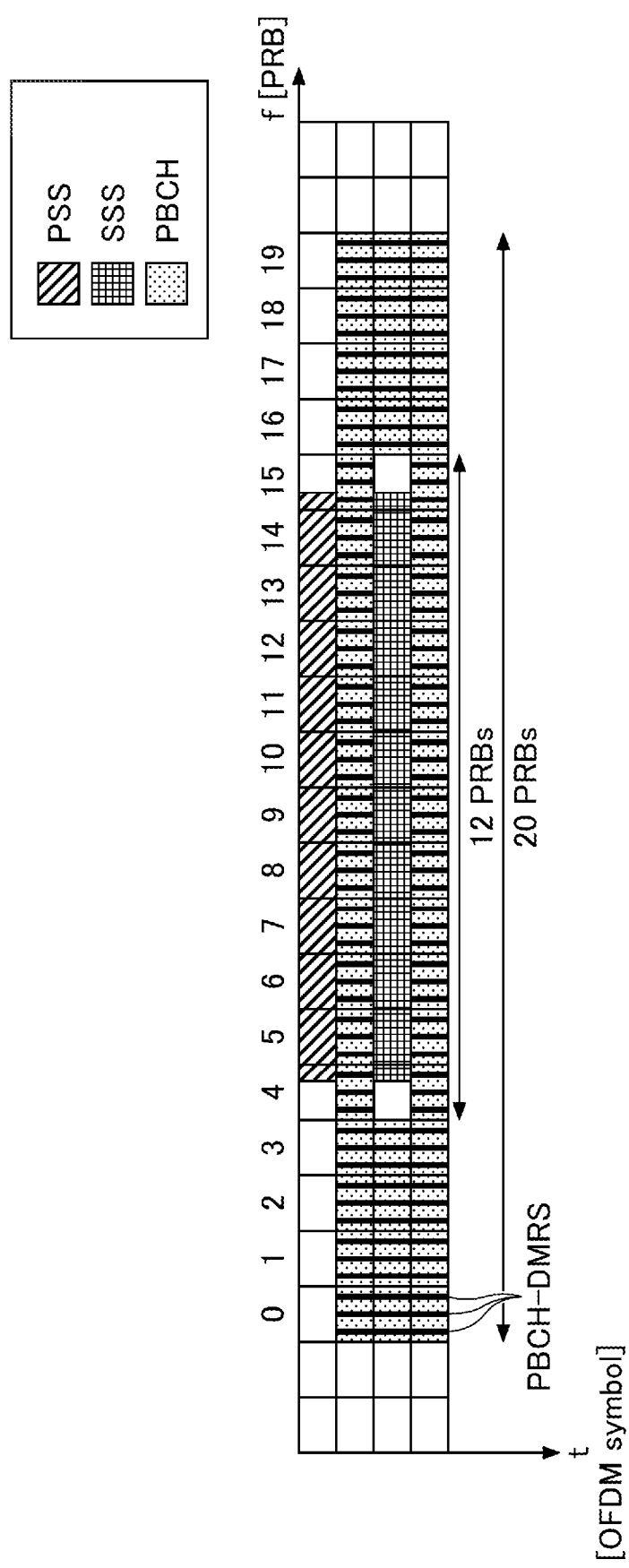
FIG. 3 is a drawing illustrating an example of an SSB structure.

FIG. 3 is a drawing illustrating a structure of SSB. As shown in FIG. 3, SSBs are arranged in a resource of 20 PRBs (Physical Resource Blocks) and four symbols. PSSs are arranged from PRB #4 to PRB #15 of the first symbol. SSSs are arranged from PRB #4 to PRB #15 of the third symbol. PBCHs are arranged from PRB #0 to PRB #20 of the second and fourth symbols, and from PRB #0 to PRB #3 and PRB #16 to PRB #20 of the third symbol. In addition, as shown in FIG. 3, PBCHs are arranged with DMRSs (Demodulation reference signals) that are arranged in every four symbols.

Table 1 is a table showing SSB symbol positions within a slot and SSB burst patterns in one half frame.

TABLE 1

| Case A (15 kHz SCS) | Case B (30 kHz SCS) | Case C (30 kHz SCS) | Case D (120 kHz SCS) | Case E (240 kHz SCS) |
| --- | --- | --- | --- | --- |
| {2, 8} + 14 · n For licensed band. N = 0, 1(, 2, 3) for <=3 GHz For unlicensed band, N = 0, 1, 2, 3, 4 | {4, 8, 16, 20} + 28 · n N = 0(, 1) | {2, 8} + 14 · n For licensed band. N = 0, 1(, 2, 3): For unlicensed band. N = 0, 1, 2, 3, 4, 5, 6, 7, 8, 9 | {4, 8, 16, 20} + 28 · n N = 0, 1, 2, 3, 5, 6, 7, 8, 10, 11, 12, 13, 15, 16, 17, 18 | {8, 12, 16, 20, 32, 36, 40, 44} + 56 · n N = 0, 1, 2, 3, 5, 6, 7, 8 |

As shown in Table 1, the SSB arrangement is configured for each SCS. For example, for 15 kHz SCS, the first symbol of the SSB is arranged in symbol #2 and symbol #8 within a slot. For licensed bands of 3 GHz or less, SSBs are arranged in slots #0 and #1. For licensed bands exceeding 3 GHz, SSBs are arranged in slots #0, #1, #2, and #3. For unlicensed bands exceeding 3 GHz, SSBs are arranged in slots #0, #1, #2, #3, and #4.

In addition, for example, in one case of 30 kHz SCS, the first symbol of the SSB is arranged in symbol #4, symbol #8, symbol #16, and symbol #20 within two slots. For bands of 3 GHz or less, SSBs are arranged in slot #0. For bands exceeding 3 GHz, SSBs are arranged in slot #0 and slot #1, slot #2 and slot #3.

In addition, for example, in another case of 30 kHz SCS, the first symbol of the SSB is arranged in symbol #2 and symbol #8 within a slot. For licensed bands, SSBs are arranged in slot #0 and slot #1, or slot #0, slot #1, slot #2, and slot #3. For unlicensed bands, SSBs are arranged in all slots from slot #0 to slot #9.

In addition, for example, for 120 kHz SCS, the first symbol of the SSB is arranged in symbol #4, symbol #8, symbol #16, and symbol #20 within two slots. SSBs are arranged in slot #0, slot #1, slot #2, slot #3, slot #5, slot #6, slot #7, slot #8, slot #10, slot #11, slot #12, slot #13, slot #15, slot #16, slot #17, and slot #18.

In addition, for example, for 240 kHz SCS, the first symbol of the SSB is arranged in symbol #8, symbol #12, symbol #16, symbol #20, symbol #32, symbol #36, symbol #40, and symbol #44 within four slots. SSBs are arranged in slot #0, slot #1, slot #2, slot #3, slot #5, slot #6, slot #7, and slot #8.

Figure 4:
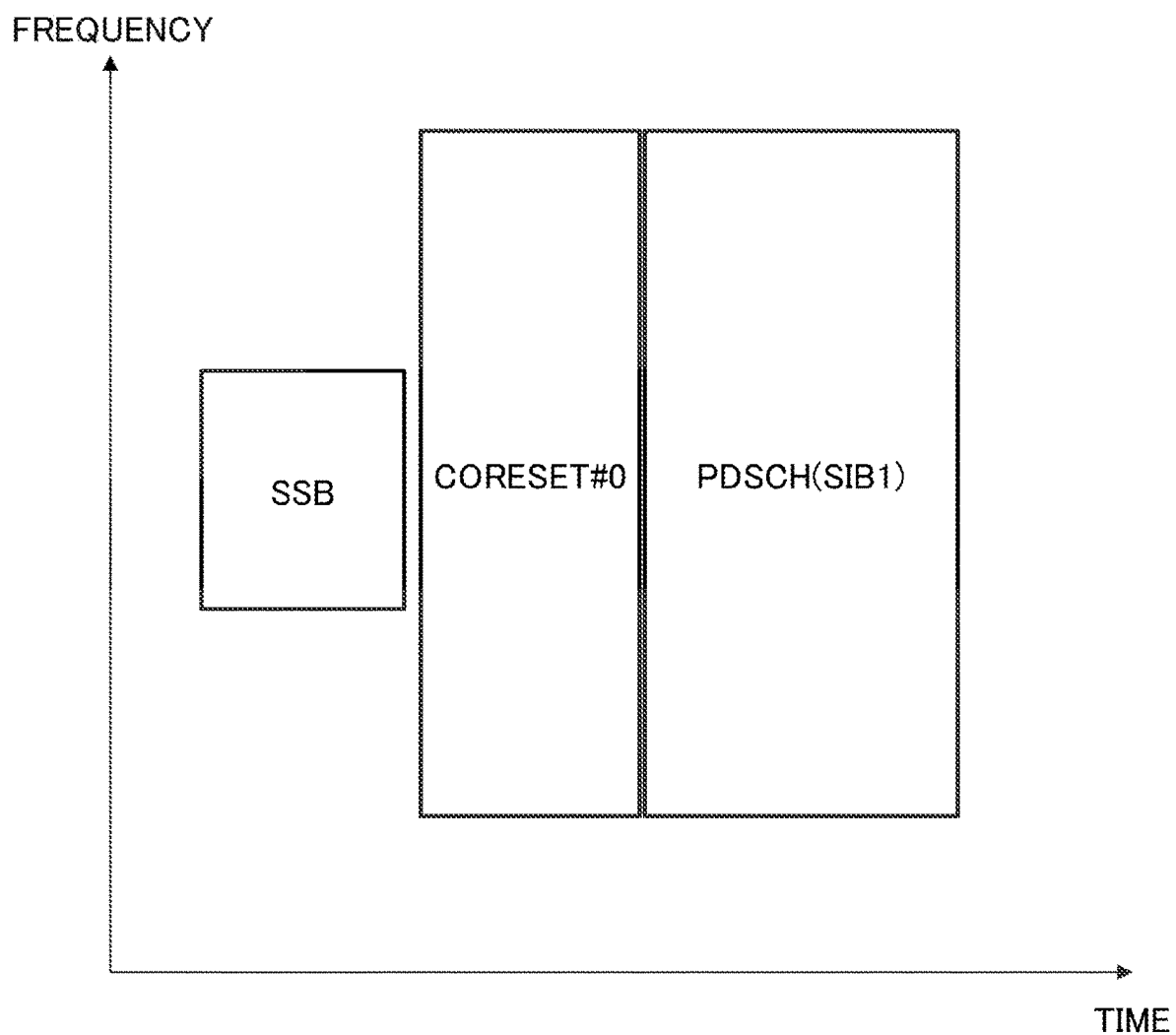
FIG. 4 is a drawing illustrating an example (1) of the arrangement of SSB and RMSI.

FIG. 4 is a drawing illustrating an example (1) of the arrangement of SSB and RMSI. As shown in FIG. 4, SSB, CORESET (Control Resource Set) #0, and PDSCH carrying RMSI (Remaining Minimum System Information), i.e., SIB1 (System Information Block 1) may be arranged in a wireless resource by TDM (Time Division Multiplexing). The TDM arrangement may be supported in FR1 (Frequency Range 1) and FR2 (Frequency Range 2). The terminal 20 may receive CORESET #0 via PDCCH.

Figure 5:
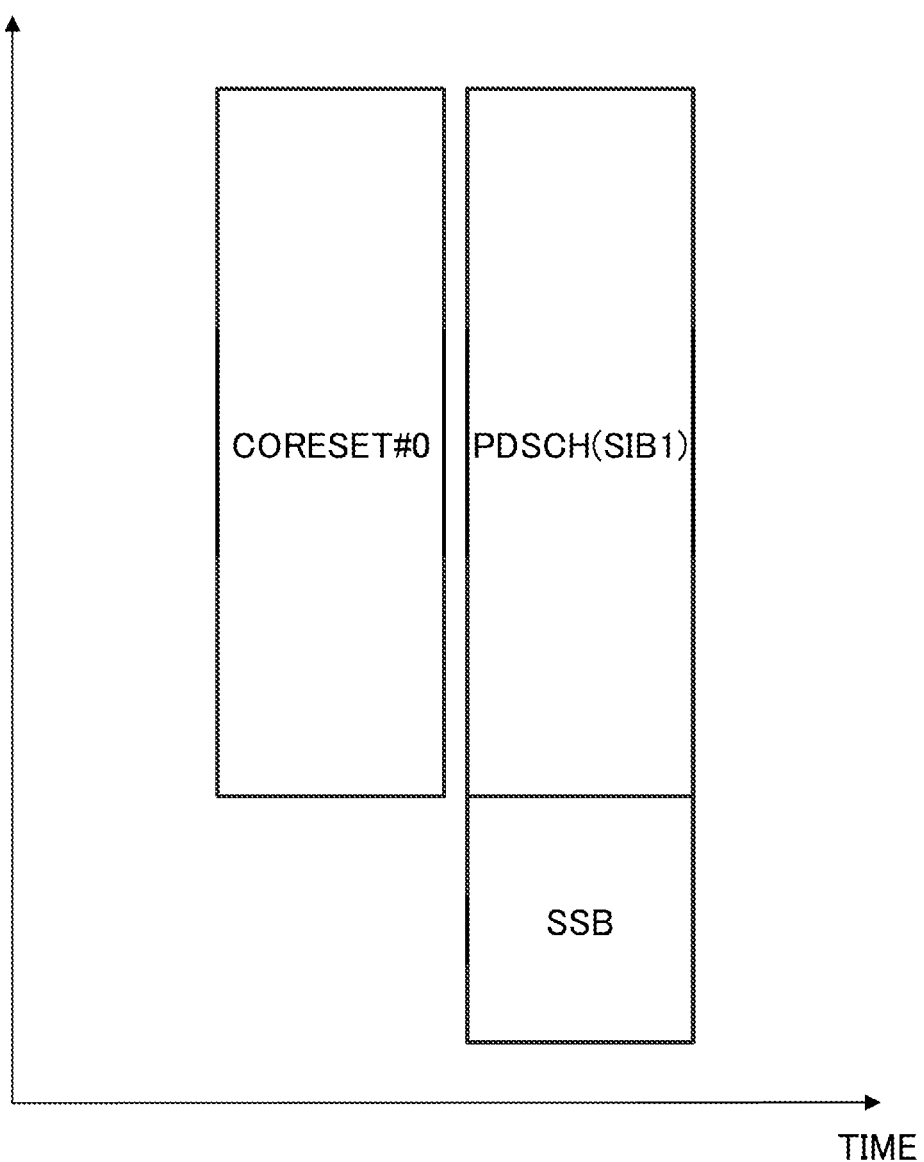
FIG. 5 is a drawing illustrating an example (2) of the arrangement of SSB and RMSI.

FIG. 5 is a drawing illustrating an example (2) of the arrangement of SSB and RMSI. As shown in FIG. 5, SSB, CORESET #0, and PDSCH carrying RMSI, i.e., SIB1 may be arranged in wireless resources by TDM and FDM (Frequency Division Multiplexing). The TDM and FDM arrangement may be supported in FR2 in a case where the SCS of SSB is twice the SCS of PDCCH.

Figure 6:
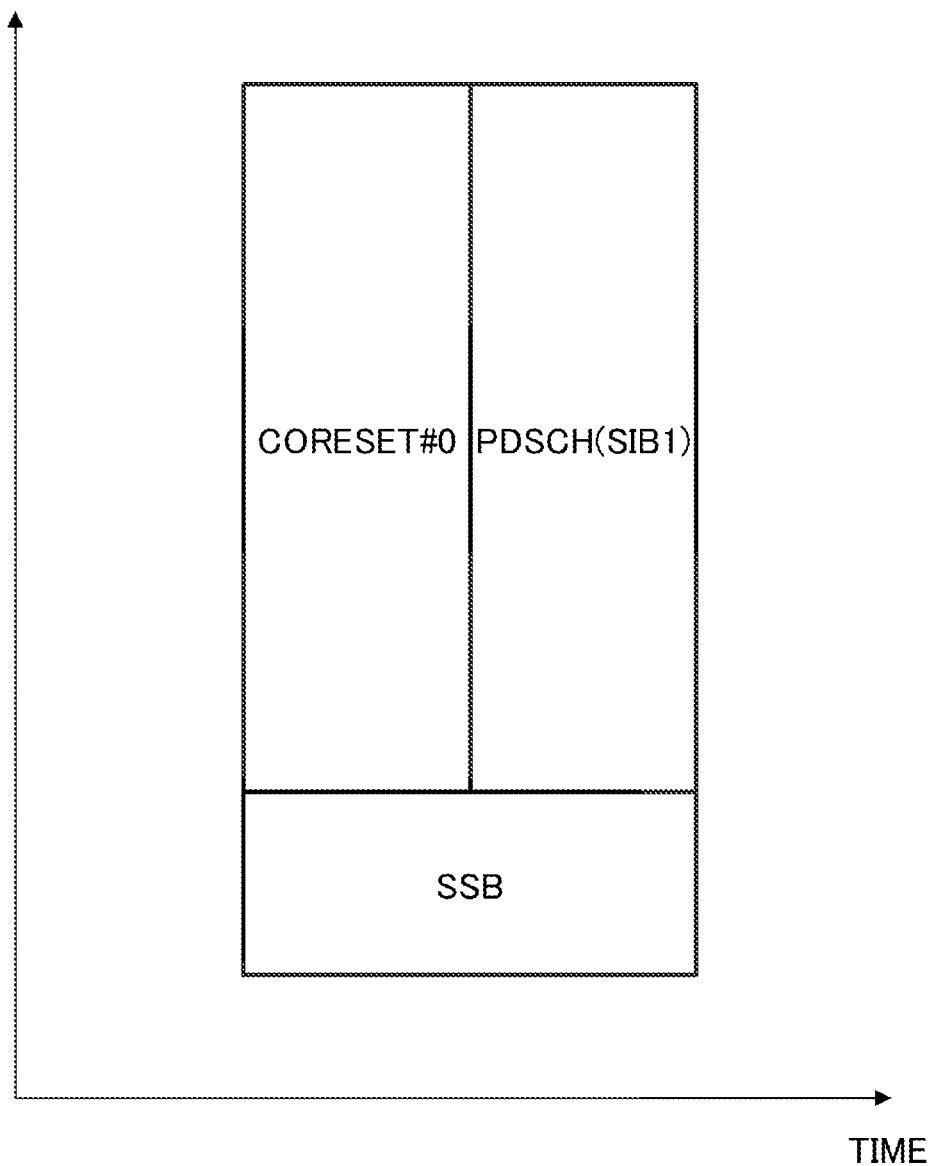
FIG. 6 is a drawing illustrating an example (3) of the arrangement of SSB and RMSI.

FIG. 6 is a drawing illustrating an example (3) of the arrangement of SSB and RMSI. As shown in FIG. 5, SSB, CORESET #0, and PDSCH carrying RMSI, i.e., SIB1 may be arranged in a wireless resource by the FDM. The FDM arrangement may be supported in FR2 in a case where the SCS of SSB is the same as the SCS of PDCCH.

In the arrangement example shown in FIG. 4 above, coverage is enhanced with respect to CORESET #0 and SIB1 because the arrangement is performed by using more symbols as compared with other arrangement examples. The arrangement example shown in FIG. 5 above does not require beam switching between reception of SSB and reception of CORESET #0 and SIB1, and is suitable for a plurality of numerologies. The arrangement example shown in FIG. 6 above does not require beam switching between reception of SSB and reception of CORESET #0 and SIB1, and is suitable for a single numerology.

For the sake of simple implementation, a single numerology operation between SSB and other signal and channel may be supported. For example, SCSs to be added, such as 480 kHz and 960 kHz, may be supported for SSB in the same way as another signal and channel.

Therefore, for example, it is necessary to determine the SSB format for 480 kHz and 960 kHz SCSs. In addition, it is necessary to determine how to multiplex SSB, CORESET #0, and SIB1.

For example, with respect to 480 kHz and 960 kHz SCSs, one SSB per slot may be arranged. In addition, for example, with respect to 480 kHz and 960 kHz SCSs, two SSBs per slot may be arranged, and a beam switching gap (i.e., guard period) may be arranged between SSB and SSB. For example, with respect to 480 kHz and 960 kHz SCSs, an SSB burst may be determined, and the multiplexing format of SSB and CORESET #0 may be determined.

Figure 7:
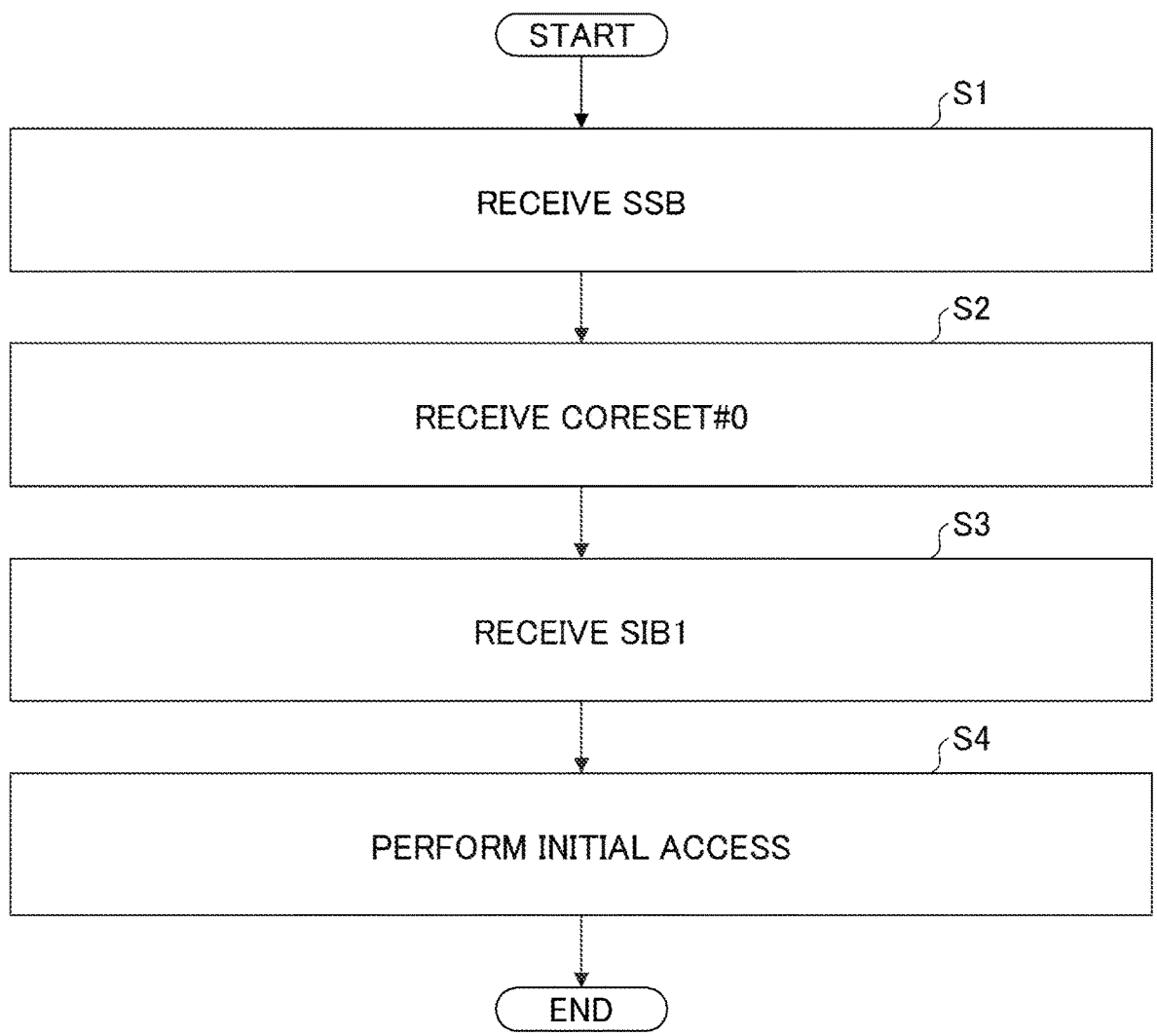
FIG. 7 is a flowchart illustrating initial access according to an embodiment of the present invention.

FIG. 7 is a flowchart illustrating initial access according to an embodiment of the present invention. In step S1, the terminal 20 receives SSB and performs synchronization with the cell. In addition, the terminal 20 receives MIB (Master Information Block) via PBCH included in the SSB. In subsequent step S2, the terminal 20 receives CORESET #0 via PDCCH. In subsequent step S3, the terminal 20 receives SIB1 based on the control information included in the CORESET #0. In subsequent step S4, the terminal 20 performs initial access to the base station 10, based on the received system information. The initial access may be performed, for example, according to a random access procedure.

Figure 8:
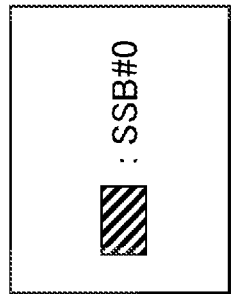
FIG. 8 is an example (1) of the arrangement of SSB and RMSI in an embodiment of the present invention.

FIG. 8 is an example (1) of the arrangement of SSB and RMSI in an embodiment of the present invention. As illustrated in FIG. 8 (A), the first symbol position of SSB may be {3}+14*n, n=0, 1, 2, 3, . . . , 63. By arranging the SSB as illustrated in FIG. 8 (A), no beam switching is required in a slot, and the first three symbols of the slot are not used for SSB monitoring but used for PDCCH monitoring. Note that, hereinafter, SSBs from SSB #0 to SSB #63 are to be determined based on n. In FIG. 8 (A), SSB #n is determined based on one n.

In addition, as illustrated in FIG. 8 (B), the first symbol position of SSB may be {4}+14*n, n=0, 1, 2, 3, . . . , 63. In FIG. 8 (B), SSB #n is determined based on one n. By arranging the SSB as illustrated in FIG. 8 (B), no beam switching is required in a slot, and the first three symbols of the slot are used for PDCCH monitoring, and the subsequent symbol can be used for the beam switching time.

In addition, as illustrated in FIG. 8 (C), the first symbol position of SSB may be {2}+14*n, n=0, 1, 2, 3, . . . , 63. In FIG. 8 (C), SSB #n is determined based on one n. By arranging the SSB as illustrated in FIG. 8 (C), no beam switching is required in a slot, and resources available for SIB1 can be increased.

In addition, as illustrated in FIG. 8 (D), the first symbol position of SSB may be {0}+14*n, n=0, 1, 2, 3, . . . , 63. In FIG. 8 (D), SSB #n is determined based on one n. By arranging the SSB as illustrated in FIG. 8 (D), no beam switching is required in a slot, there is no need of FDM with SIB1, and only FDM with CORESET #0 needs to be considered.

In addition, as another example, the first symbol position of SSB may be {3, 14, 28, 42}+56*n, n=0, 1, 2, 3, . . . , 15. In this example, SSB #4n, SSB #(4n+1), SSB #(4n+2) and SSB #(4n+3) are determined based on one n. With this SSB arrangement, in a case where PDCCH monitoring is not required, no PDCCH monitoring other than CORESET #0 is to be considered.

Figure 9:
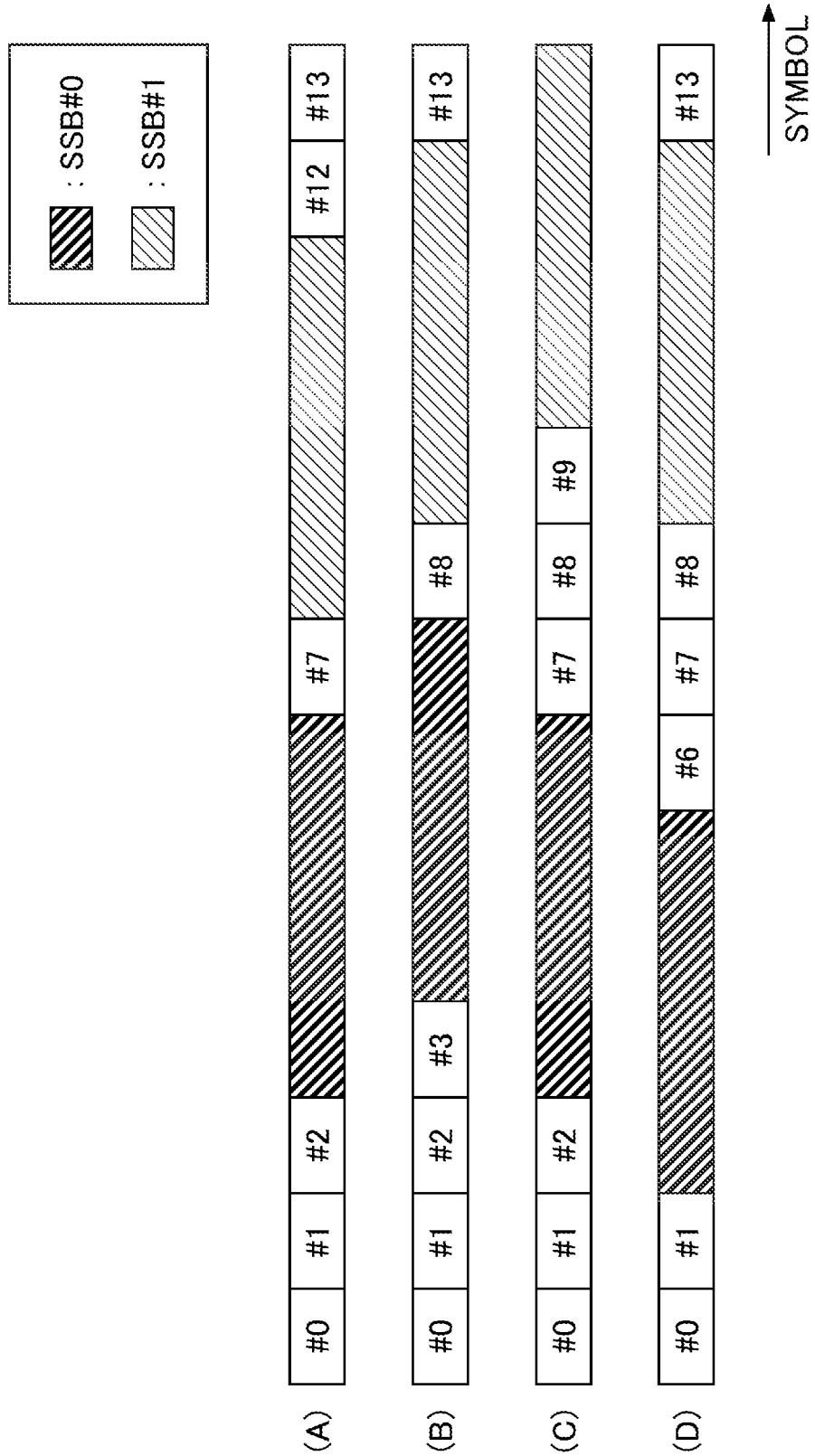
FIG. 9 is an example (2) of the arrangement of SSB and RMSI in an embodiment of the present invention.

FIG. 9 is an example (2) of the arrangement of SSB and RMSI in an embodiment of the present invention. As illustrated in FIG. 9 (A), the first symbol position of SSB may be {3, 8}+14*n, n=0, 1, 2, 3, . . . , 31. In FIG. 9 (A), SSB #2n and SSB #(2n+1) are determined based on one n. By arranging the SSB as illustrated in FIG. 9 (A), the latency related to the beam sweeping can be reduced, and a sufficient guard period for beam switching can be provided. In addition, the first three symbols in a slot need not be used for SSB monitoring, and can be used for PDCCH monitoring.

As illustrated in FIG. 9 (B), the first symbol position of SSB may be {4, 9}+14*n, n=0, 1, 2, 3, . . . , 31. In FIG. 9 (B), SSB #2n and SSB #(2n+1) are determined based on one n. By arranging the SSB as illustrated in FIG. 9 (B), the latency related to the beam sweeping can be reduced, and a sufficient guard period for beam switching can be provided. In addition, the first three symbols in a slot can be used for PDCCH monitoring, and a subsequent symbol can be used for the beam switching time.

As illustrated in FIG. 9 (C), the first symbol position of SSB may be {3, 10}+14*n, n=0, 1, 2, 3, . . . , 31. In FIG. 9 (C), SSB #2n and SSB #(2n+1) are determined based on one n. By arranging the SSB as illustrated in FIG. 9 (C), the latency related to the beam sweeping can be reduced, and a sufficient guard period for beam switching can be provided. In addition, the terminal 20 can assume the same symbol position in each half slot.

As illustrated in FIG. 9 (D), the first symbol position of SSB may be {2, 9}+14*n, n=0, 1, 2, 3, . . . , 31. In FIG. 9 (D), SSB #2n and SSB #(2n+1) are determined based on one n. By arranging the SSB as illustrated in FIG. 9 (D), the latency related to the beam sweeping can be reduced, and a sufficient guard period for beam switching can be provided. In addition, the terminal 20 can assume the same symbol position in each half slot.

Figure 10:
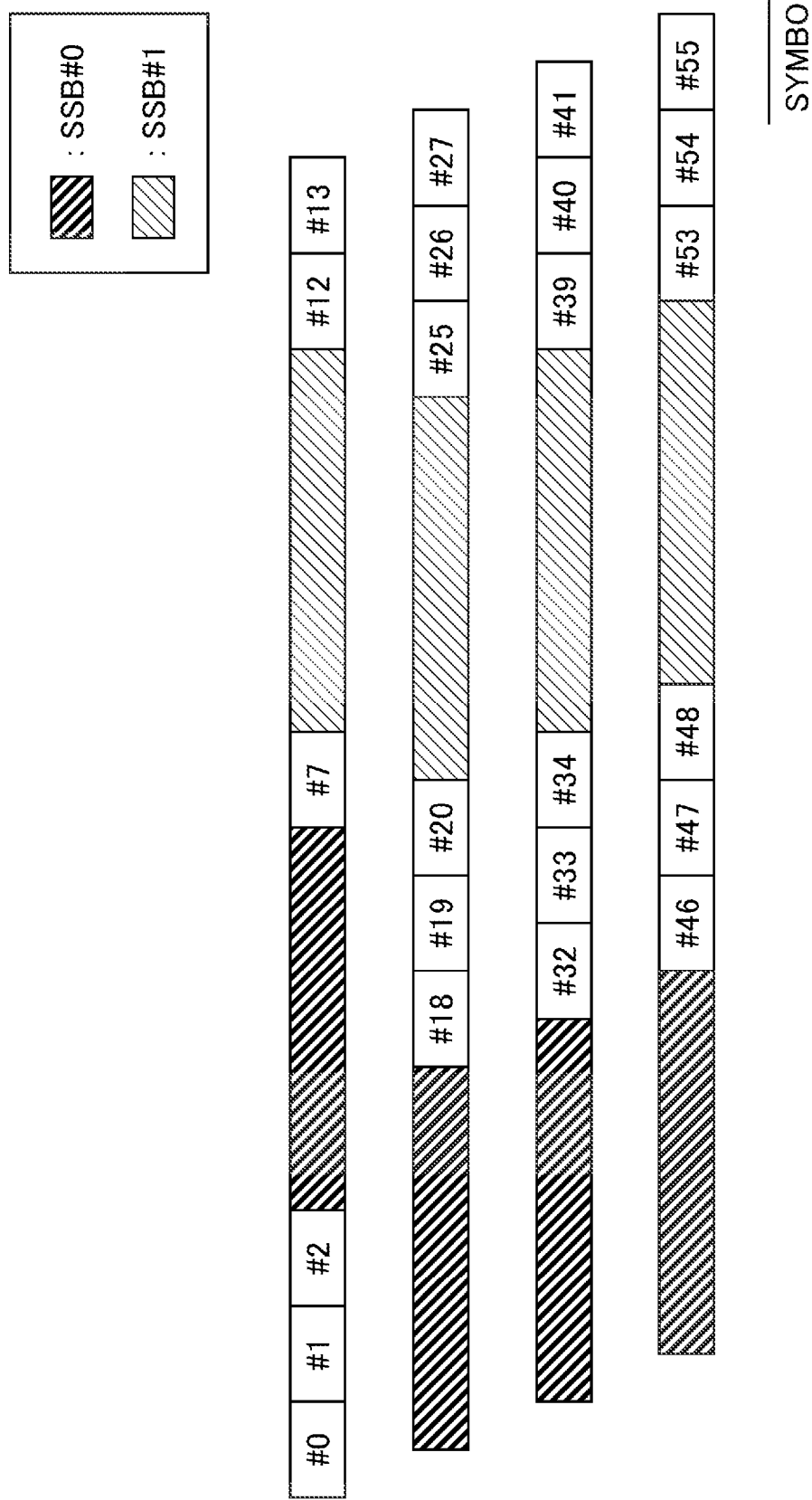
FIG. 10 is an example (3) of the arrangement of SSB and RMSI in an embodiment of the present invention.

FIG. 10 is an example (3) of the arrangement of SSB and RMSI in an embodiment of the present invention. As illustrated in FIG. 10, SSBs may be arranged at different symbol positions in different slots. As illustrated in FIG. 10, the first symbol position of SSB may be {3, 8, 14, 21, 28, 35, 42, 49}+56*n, n=0, 1, 2, 3, . . . , 15. In FIG. 10, SSB #4n, SSB #(4n+1), SSB #(4n+2) and SSB #(4n+3) are determined based on one n. By arranging the SSB as illustrated in FIG. 10, the latency related to the beam sweeping can be reduced, and a sufficient guard period for beam switching can be provided. In addition, in a case where PDCCH monitoring is not required, no PDCCH monitoring other than CORESET #0 is to be considered.

In addition, as another example, the first symbol position of SSB may be {4, 8}+14*n, n=0, 1, 2, 3, . . . , 31. In this example, no gap is configured between SSBs in a slot, and thus, the structure can be the same as that in release 15 or release 16.

In addition, as an example of a format in which the SSB bursts are 50 contiguous in slot units, the first symbol position of SSB may be {3}+14*n, n=0, 1, 2, 3, . . . , 63. In this example, a shorter SMTC (SS block based RRM measurement timing configuration) window can be configured. For example, with respect to 480 kHz SCS, the SMTC window length can be 2 ms, and, with respect to 960 kHz SCS, the SMTC window length can be 1 ms.

In addition, as an example of a format in which the SSB bursts are contiguous in slot units, the first symbol position of SSB may be {3, 8}+14*n, n=0, 1, 2, 3, . . . , 31. In this example, a further shorter SMTC window can be configured. For example, with respect to 480 kHz SCS, the SMTC window length can be 1 ms, and, with respect to 960 kHz SCS, the SMTC window length can be 0.5 ms.

In addition, as an example of a format in which the SSB bursts are non-contiguous in slot units, the first symbol position of SSB may be {3}+14*n, n=0, 1, 2, 3, . . . , 31, 40, . . . , 71. In other words, n=0, 1, 2, 3, . . . , 31 correspond to SSBs from SSB #0 to SSB #31, and n=40, . . . , 71 correspond to SSBs from SSB #32 to SSB #63. In this example, during the SMTC window, at least one slot can be provided which is fully available for data. In addition, the configuration in this example is the same as the configuration at the time of 120 kHz SCS or 240 kHz SCS, and a period of 0.25 ms is provided for every SSB burst of 1 ms, the 0.25 ms being a period in which period no SSB is arranged.

Figure 11:
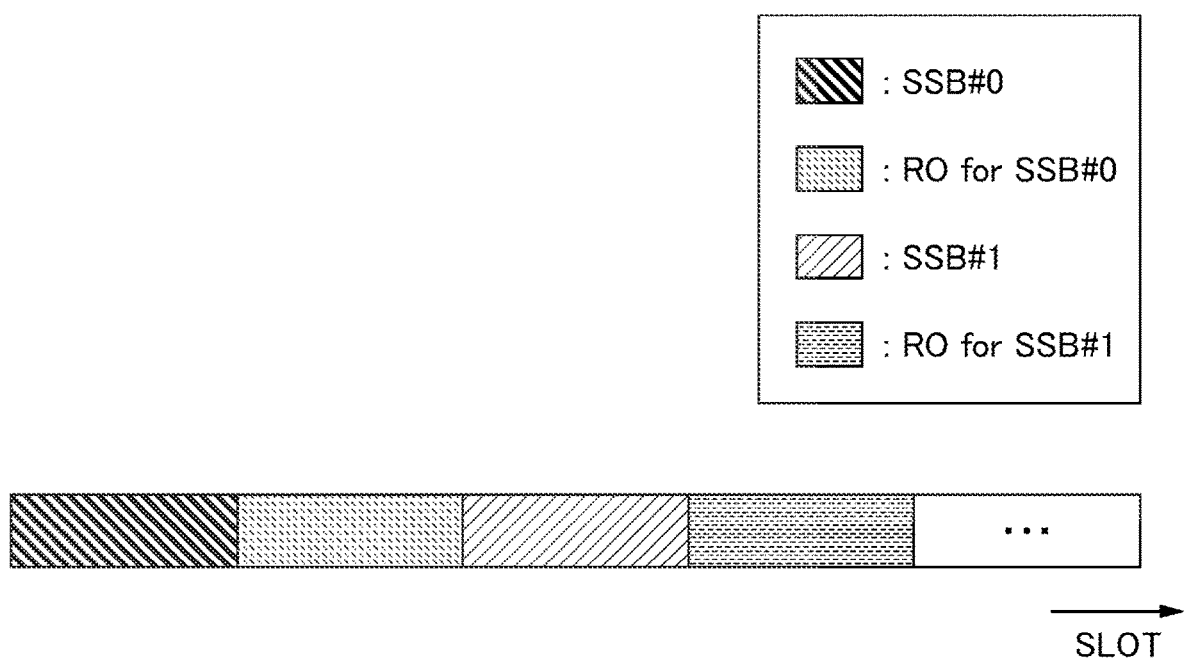
FIG. 11 is an example (4) of the arrangement of SSB and RMSI in an embodiment of the present invention.

FIG. 11 is an example (4) of the arrangement of SSB and RMSI in an embodiment of the present invention. As illustrated in FIG. 11, as an example of a format in which the SSB bursts are non-contiguous in slot units, the first symbol position of SSB may be {3}+14*n, n=0, 2, 4, . . . , 126. In other words, SSB #(n/2) is determined based on one n. As illustrated in FIG. 11, during the SMTC window, at least one slot can be provided which is fully available for data. In addition, as illustrated in FIG. 11, RO (Random access occasion) can be arranged immediately after each corresponding SSB.

Figure 12:
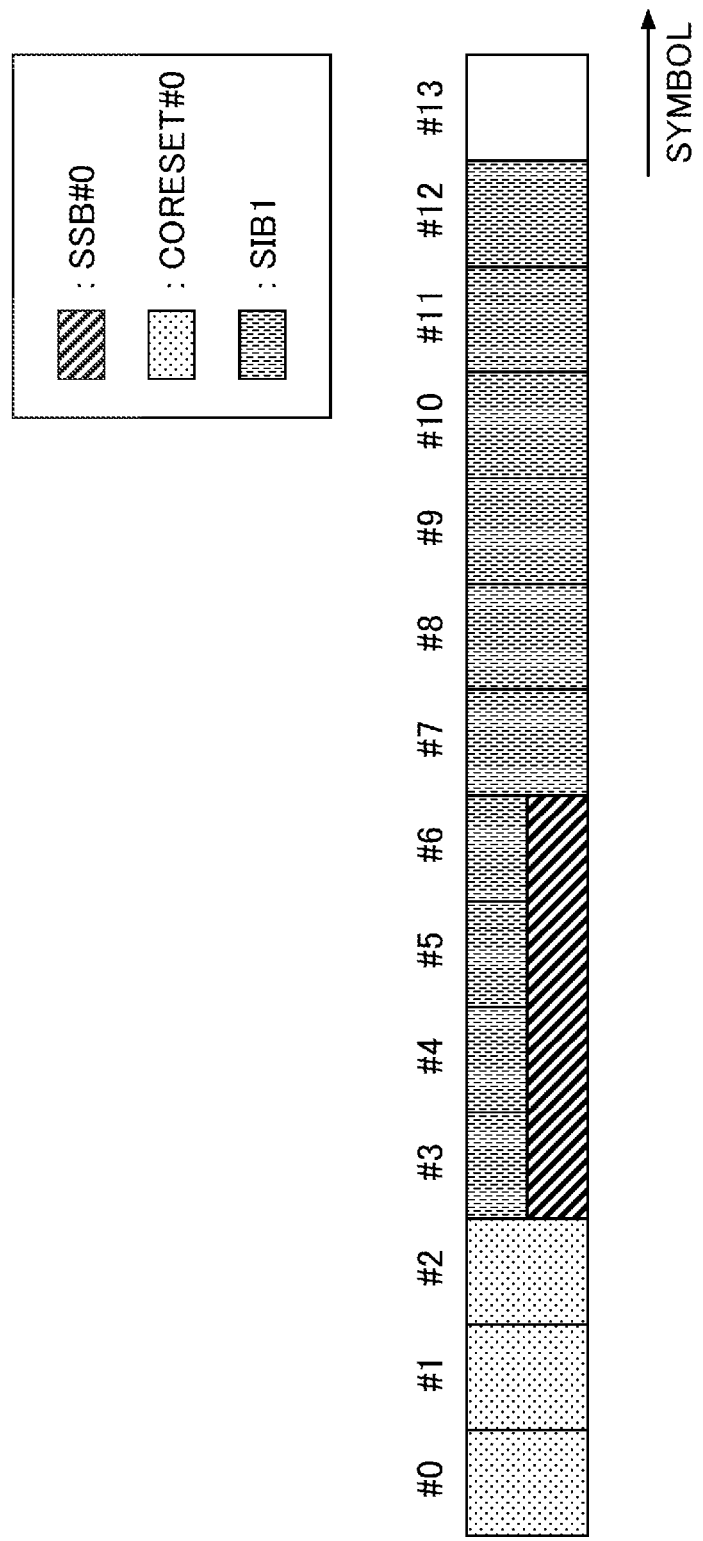
FIG. 12 is an example (5) of the arrangement of SSB and RMSI in an embodiment of the present invention.

Hereinafter, a method of applying TDM will be described. FIG. 12 is a drawing illustrating an example (5) of the arrangement of SSB and RMSI in an embodiment of the present invention. As illustrated in FIG. 12, as an example of TDM without beam switching, SSB may be arranged from symbol #3 to symbol #6, the same beam as a beam applied to SSB may be applied to CORESET #0 that is arranged from symbol #0 to symbol #2, and the same beam as a beam applied to SSB may be applied to SIB1 that is arranged from symbol #3 to symbol #12. According to the arrangement illustrated in FIG. 12, there is no need for the beam switching between SSB, and CORESET #0 and SIB1, and more symbols can be allocated for CORESET #0 and SIB1. In addition, the terminal 20 can transmit SSB, CORESET #0, and SIB1 within one beam sweeping.

In addition, as an example of TDM without beam switching, the SIB1 resource may be determined based on the SSB resource. For example, in symbols in which SSB is transmitted, RBs of the symbols used by SSB are not required to be used by SIB1, and RBs of the symbols not used by SSB may be used by SIB1. In symbols in which SSB is not transmitted, the frequency resource of SIB1 may be determined according to an indication by CORESET #0. According to this example, the frequency resource can be efficiently used by taking into account the wider RB size due to the larger SCS.

Figure 13:
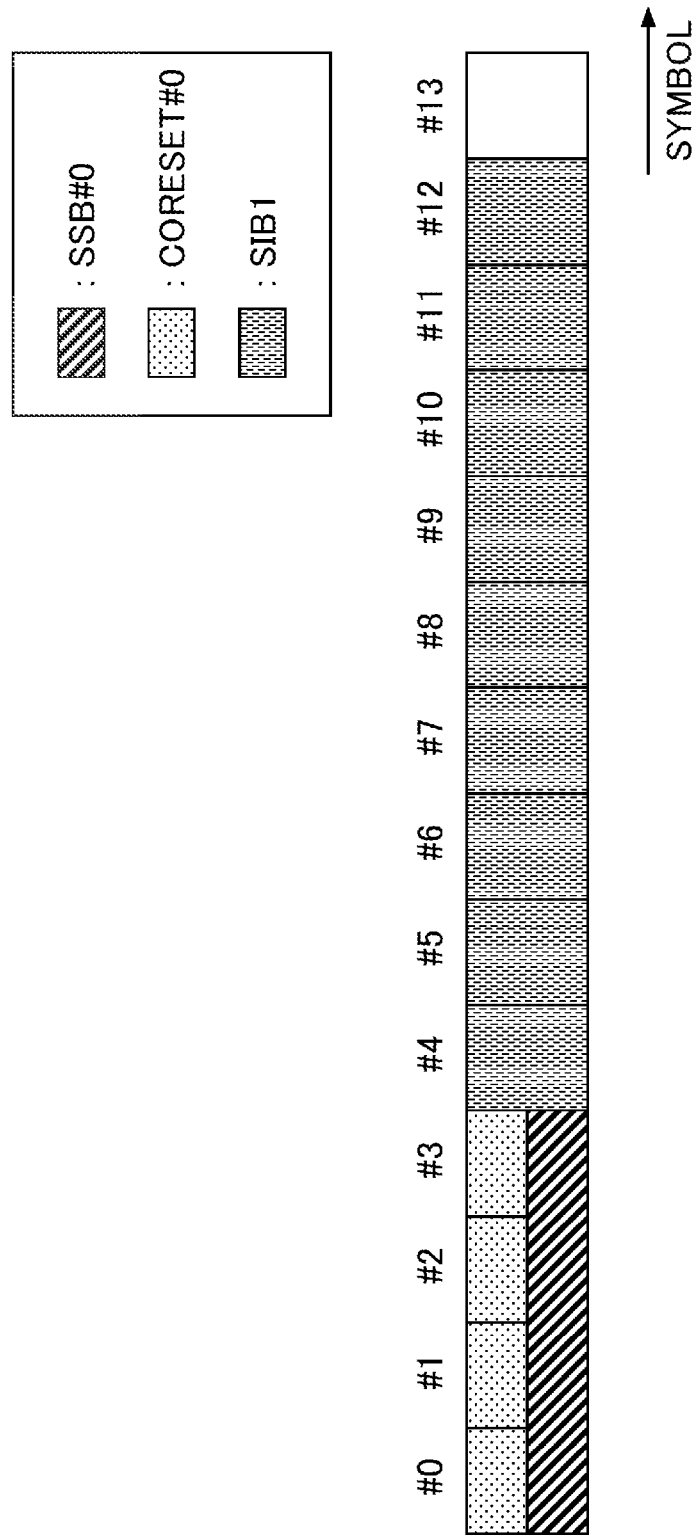
FIG. 13 is an example (6) of the arrangement of SSB and RMSI in an embodiment of the present invention.

FIG. 13 is a drawing illustrating an example (6) of the arrangement of SSB and RMSI in an embodiment of the present invention. As illustrated in FIG. 13, as an example of TDM without beam switching, SSB may be arranged from symbol #0 to symbol #3, the same beam as a beam applied to SSB may be applied to CORESET #0 that is arranged from symbol #0 to symbol #3, and the same beam as a beam applied to SSB may be applied to SIB1 that is arranged from symbol #4 to symbol #12. According to the arrangement illustrated in FIG. 12, there is no need for the beam switching between SSB, and CORESET #0 and SIB1, and more symbols can be allocated for CORESET #0 and SIB1. In addition, the terminal 20 can transmit SSB, CORESET #0, and SIB1 within one beam sweeping.

Hereinafter, a method of applying FDM will be described. FDM may be applied between different numerologies (i.e., different SCSs). For example, FDM may be applied to any combination among 120, 240, 480, and 960 kHz SCSs. In addition, CORESET #0 and SIB1 may be frequency-multiplexed with SSB. In addition, CORESET #0 may be frequency-multiplexed with SSB.

In addition, the number of symbols for CORESET #0 may be the same as, or may be different from, the number of symbols for SIB1. The number of symbols for CORESET #0 and the number of symbols for SIB1 may be determined based on an indication. For example, the number of symbols for CORESET #0 and the number of symbols for SIB1 may be indicated by an information element pdcch-ConfigSIB1 included in PBCH. CORESET #0 and/or SIB1 may be arranged by crossing the slot boundary for SCS applied to CORESET #0, or may be arranged by not crossing the slot boundary for SCS applied to CORESET #0.

Figure 14:
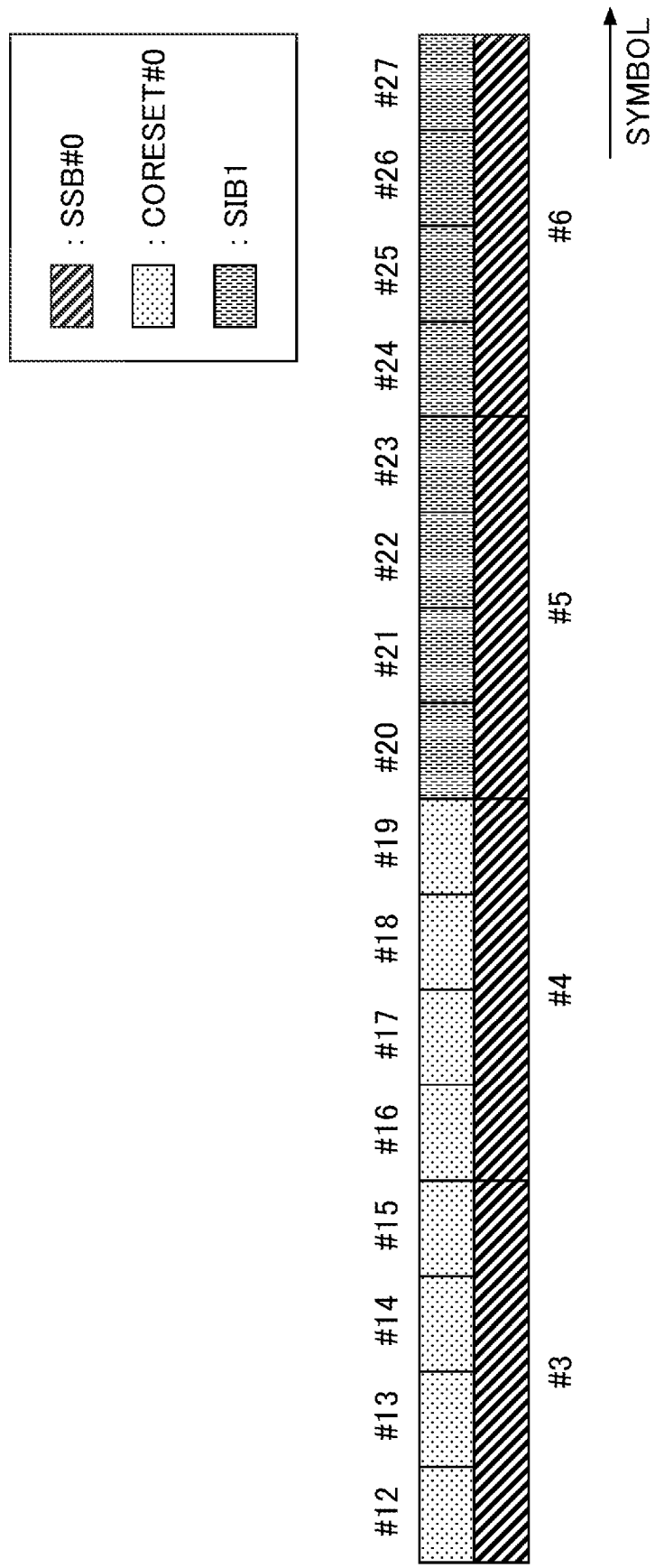
FIG. 14 is an example (7) of the arrangement of SSB and RMSI in an embodiment of the present invention.

FIG. 14 is a drawing illustrating an example (7) of the arrangement of SSB and RMSI in an embodiment of the present invention. In an example illustrated in FIG. 14, SCS applied to SSB is 120 kHz, and SCS applied to CORESET #0 and SIB1 is 480 kHz. FIG. 14 is an example in which, in a carrier of 480 kHz SCS, 8 symbols are allocated for CORESET #0, 8 symbols are allocated for SIB1, and, during the same period, 4 symbols are allocated for SSB in a carrier of 120 kHz.

For example, when the first symbol of a half frame of 480 kHz SCS is denoted as symbol #0, CORESET #0 may be arranged from symbol #12 to symbol #19, and SIB1 may be arranged from symbol #20 to symbol #27. For example, when the first symbol of a half frame of 120 kHz SCS is denoted as symbol #0, SSB #0 may be arranged from symbol #3 to symbol #6. Note that the same beam as that of SSB #0 may be applied to CORESET #0 and SIB1.

By arranging SSB, CORESET #0, and SIB1 as illustrated in FIG. 14, there is no need for the beam switching between the SSB and the CORESET #0 and SIB1, and the delay related to decoding of SIB1 can be reduced.

Figure 15:
FIG. 15 is an example (8) of the arrangement of SSB and RMSI in an embodiment of the present invention.

FIG. 15 is a drawing illustrating an example (8) of the arrangement of SSB and RMSI in an embodiment of the present invention. In a carrier of 480 kHz SCS, the arrangement may be performed in which m symbols are allocated for CORESET #0, n symbols are allocated for SIB1, and m+n=16. In an example illustrated in FIG. 15, SCS applied to SSB is 120 kHz, and SCS applied to CORESET #0 and SIB1 is 480 kHz. FIG. 15 is an example in which, in a carrier of 480 kHz SCS, 4 symbols are allocated for CORESET #0, 12 symbols are allocated for SIB1, and, during the same period, 4 symbols are allocated for SSB in a carrier of 120 kHz.

For example, when the first symbol of a half frame of 480 kHz SCS is denoted as symbol #0, CORESET #0 may be arranged from symbol #12 to symbol #15, and SIB1 may be arranged from symbol #16 to symbol #27. For example, when the first symbol of a half frame of 120 kHz SCS is denoted as symbol #0, SSB #0 may be arranged from symbol #3 to symbol #6. Note that the same beam as that of SSB #0 may be applied to CORESET #0 and SIB1.

The above-described m and n may be determined according to one of 1) to 4) shown below, or a combination thereof.
1) Slot boundary with SCS that is applied to CORESET #0 (i.e., 480 kHz).
2) Ratio of the number of payload bits of CORESET #0 to the number of payload bits of SIB1. For example, more symbols may be allocated for the one with larger number of payload bits.
3) Indication in PBCH. For example, pdcch-ConfigSIB1 may be reused.
4) Indication by SSB index By arranging SSB, CORESET #0, and SIB1 as illustrated in FIG. 15, there is no need for the beam switching between the SSB and the CORESET #0 and SIB1, and the delay related to decoding of SIB1 can be reduced.

Figure 16:
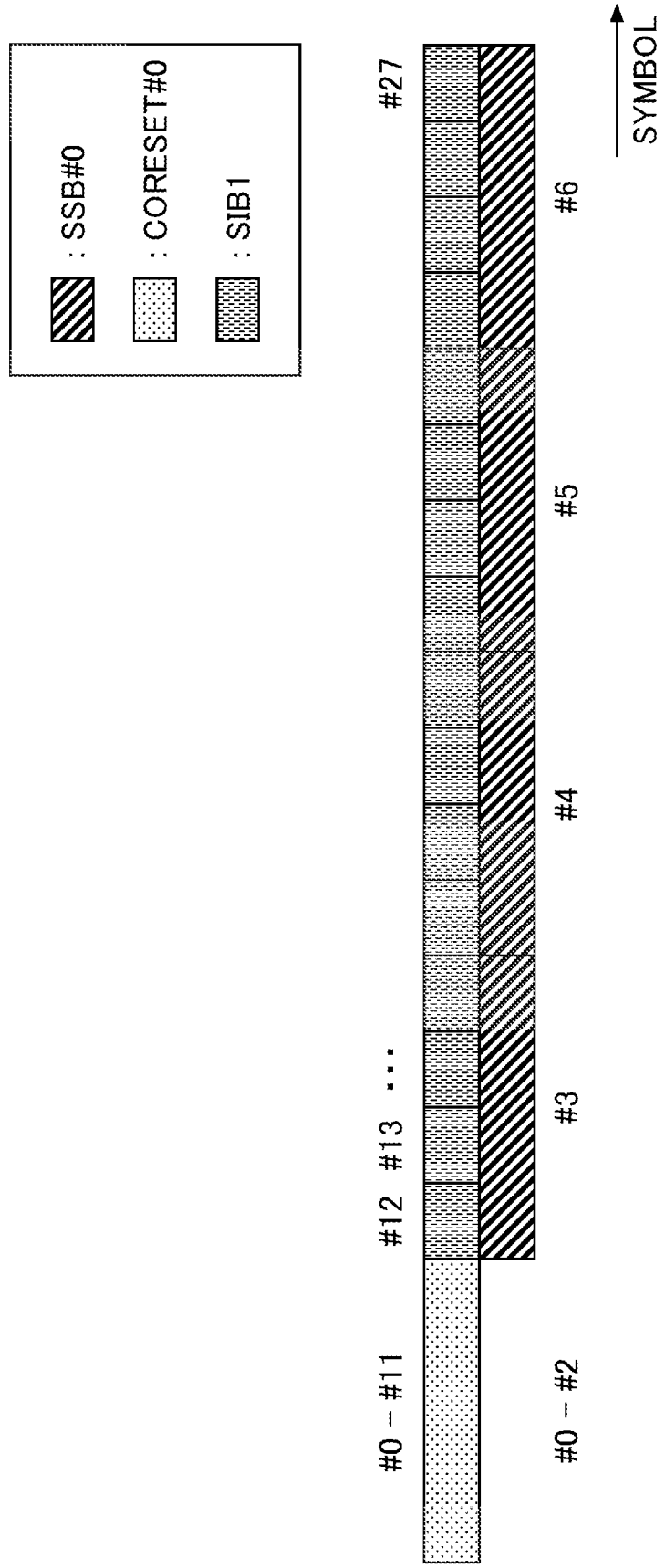
FIG. 16 is an example (9) of the arrangement of SSB and RMSI in an embodiment of the present invention.

FIG. 16 is a drawing illustrating an example (9) of the arrangement of SSB and RMSI in an embodiment of the present invention. In a carrier of 480 kHz SCS, the arrangement may be performed in which m symbols are allocated for CORESET #0, n symbols are allocated for SIB1, and the total symbols of CORESET #0 and SIB1 do not match the SSB duration. In an example illustrated in FIG. 16, SCS applied to SSB is 120 kHz, and SCS applied to CORESET #0 and SIB1 is 480 kHz. FIG. 16 is an example in which, in a carrier of 480 kHz SCS, 12 symbols are allocated for CORESET #0, 16 symbols are allocated for SIB1, and, during the same period as SIB1, 4 symbols of SSB are allocated in a carrier of 120 kHz.

For example, when the first symbol of a half frame of 480 kHz SCS is denoted as symbol #0, CORESET #0 may be arranged from symbol #0 to symbol #11, and SIB1 may be arranged from symbol #12 to symbol #27. For example, when the first symbol of a half frame of 120 kHz SCS is denoted as symbol #0, SSB #0 may be arranged from symbol #3 to symbol #6. Note that the same beam as that of SSB #0 may be applied to CORESET #0 and SIB1.

FIG. 16 is an example in which m=12 and n=16. The above-described m and n may be determined according to one of 1) to 4) shown below, or a combination thereof.
1) Slot boundary with SCS that is applied to CORESET #0 (i.e., 480 kHz).
2) Ratio of the number of payload bits of CORESET #0 to the number of payload bits of SIB1. For example, more symbols may be allocated for the one with larger number of payload bits.
3) Indication in PBCH. For example, pdcch-ConfigSIB1 may be reused.
4) Indication by SSB index
50 By arranging SSB, CORESET #0, and SIB1 as illustrated in FIG. 16, there is no need for the beam switching between the SSB and the CORESET #0 and SIB1, and the delay related to decoding of SIB1 can be reduced.

Note that, as an arrangement example of SSB and RMSI, in FIG. 16, SSB may be arranged from symbol #0 to symbol #3, and, CORESET #0 symbols from symbol #0 to symbol 11 and SIB1 symbols from symbol #12 to symbol #15 may be frequency-multiplexed with SSB.

In addition, as an arrangement example of SSB an RMSI, in FIG. 16, SSB may be arranged from symbol #0 to symbol #3, and may be frequency-multiplexed with CORESET #0 symbols from symbol #0 to symbol 11, and SIB1 is not required to be frequency-multiplexed with SSB, and may be arranged from symbol #16 to symbol #31. In addition, CORESET #0 may be arranged from symbol #0 to symbol #15.

Figure 17:
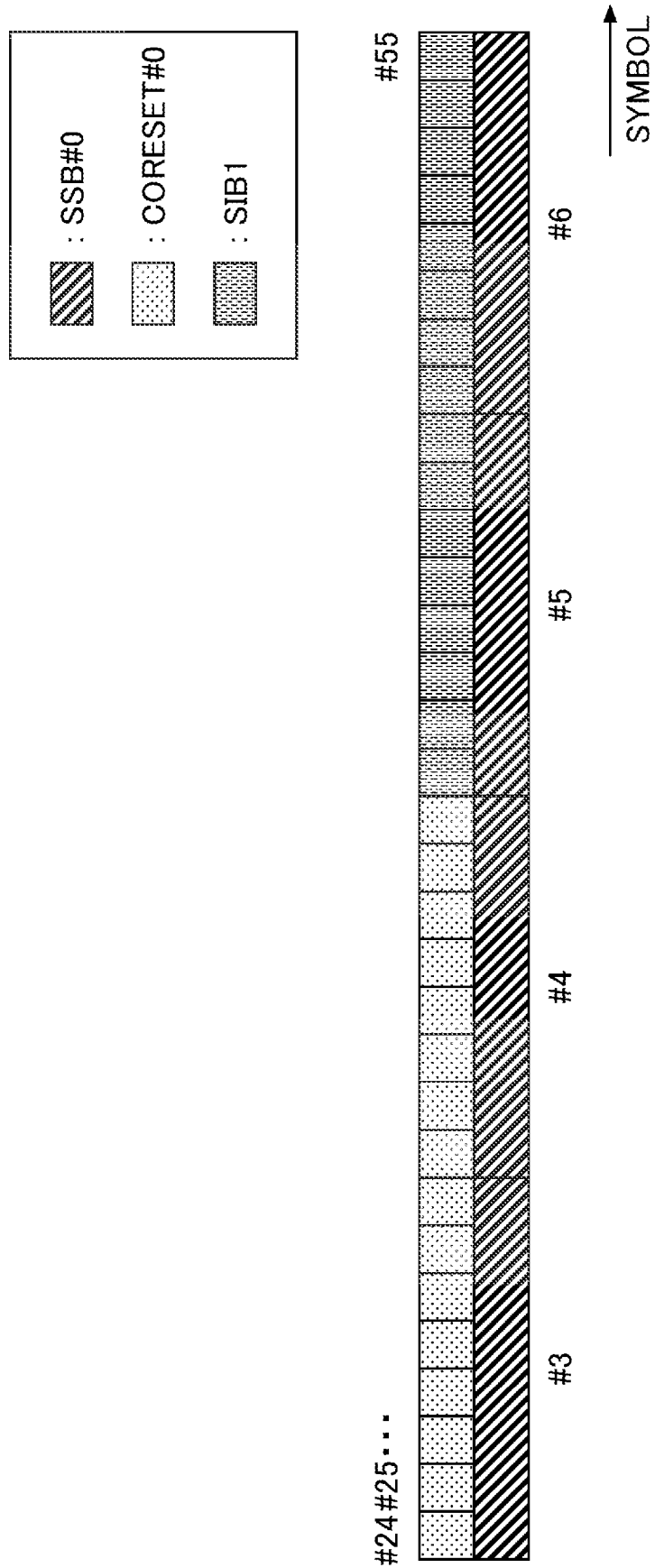
FIG. 17 is an example (10) of the arrangement of SSB and RMSI in an embodiment of the present invention.

FIG. 17 is a drawing illustrating an example (10) of the arrangement of SSB and RMSI in an embodiment of the present invention. In a carrier of 960 kHz SCS, the arrangement may be performed in which m symbols are allocated for CORESET #0, n symbols are allocated for SIB1, and m+n=32. In an example illustrated in FIG. 175, SCS applied to SSB is 120 kHz, and SCS applied to CORESET #0 and SIB1 is 960 kHz. FIG. 17 is an example in which, in a carrier of 960 kHz SCS, 16 symbols are allocated for CORESET #0, 16 symbols are allocated for SIB1, and, during the same period, 4 symbols are allocated for SSB in a carrier of 120 kHz.

For example, when the first symbol of a half frame of 960 kHz SCS is denoted as symbol #0, CORESET #0 may be arranged from symbol #24 to symbol #39, and SIB1 may be arranged from symbol #40 to symbol #55. For example, when the first symbol of a half frame of 120 kHz SCS is denoted as symbol #0, SSB #0 may be arranged from symbol #3 to symbol #6. Note that the same beam as that of SSB #0 may be applied to CORESET #0 and SIB1.

FIG. 17 is an example in which m=16 and n=16. The above-described m and n may be determined according to one of 1) to 4) shown below, or a combination thereof.
  1) Slot boundary with SCS that is applied to CORESET #0 (i.e., 960 kHz).
  2) Ratio of the number of payload bits of CORESET #0 to the number of payload bits of SIB1. For example, more symbols may be allocated for the one with larger number of payload bits.
  3) Indication in PBCH. For example, pdcch-ConfigSIB1 may be reused.
  4) Indication by SSB index By arranging SSB, CORESET #0, and SIB1 as illustrated in FIG. 17, there is no need for the beam switching between the SSB and the CORESET #0 and SIB1, and the delay related to decoding of SIB1 can be reduced.

Figure 18:
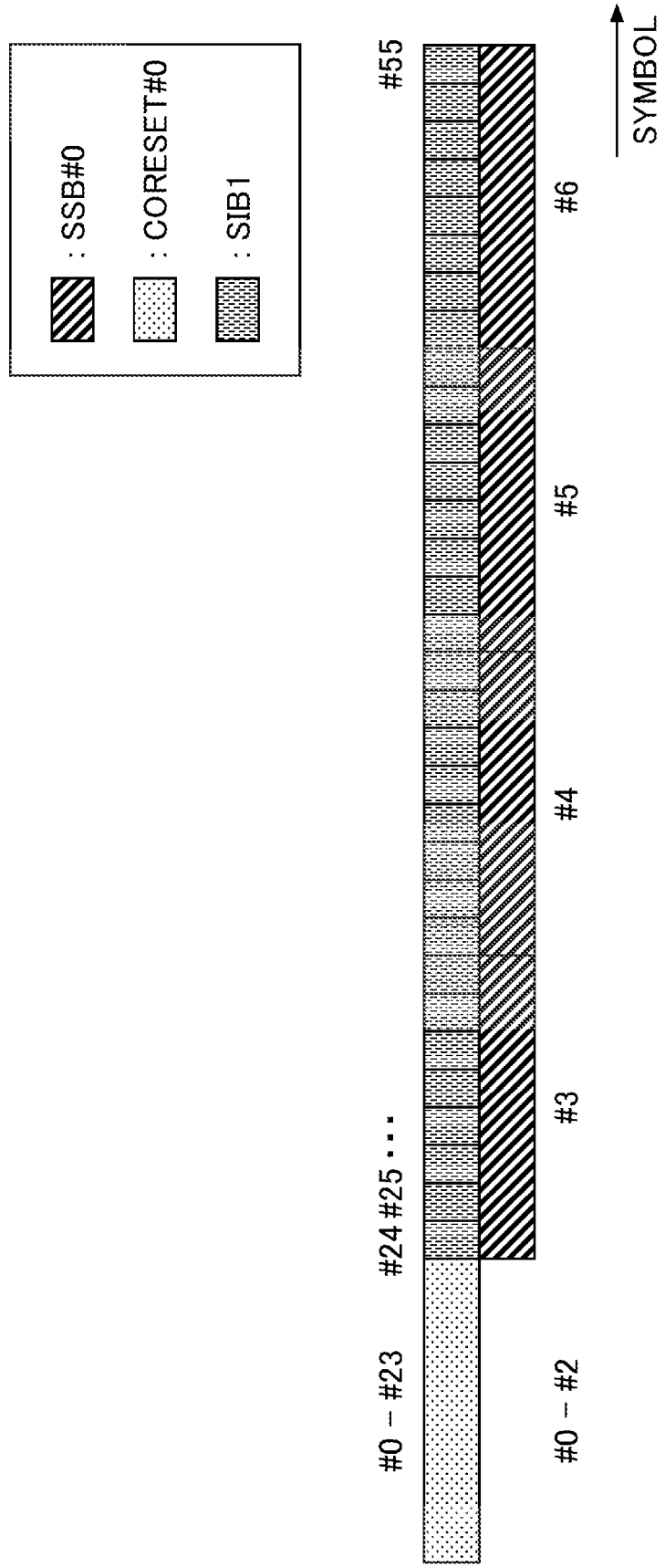
FIG. 18 is an example (11) of the arrangement of SSB and RMSI in an embodiment of the present invention.

FIG. 18 is a drawing illustrating an example (11) of the arrangement of SSB and RMSI in an embodiment of the present invention. In a carrier of 960 kHz SCS, the arrangement may be performed in which m symbols are allocated for CORESET #0, n symbols are allocated for SIB1, and the total symbols of CORESET #0 and SIB1 do not match the SSB duration. In an example illustrated in FIG. 18, SCS applied to SSB is 120 kHz, and SCS applied to CORESET #0 and SIB1 is 960 kHz. FIG. 18 is an example in which, in a carrier of 960 kHz SCS, 24 symbols are allocated for CORESET #0, 32 symbols are allocated for SIB1, and, during the same period as SIB1, 4 symbols of SSB are allocated in a carrier of 120 kHz.

For example, when the first symbol of a half frame of 960 kHz SCS is denoted as symbol #0, CORESET #0 may be arranged from symbol #0 to symbol #23, and SIB1 may be arranged from symbol #24 to symbol #55. For example, when the first symbol of a half frame of 120 kHz SCS is denoted as symbol #0, SSB #0 may be arranged from symbol #3 to symbol #6. Note that the same beam as that of SSB #0 may be applied to CORESET #0 and SIB1.

FIG. 18 is an example in which m=24 and n=32. The above-described m and n may be determined according to one of 1) to 4) shown below, or a combination thereof.
  1) Slot boundary with SCS that is applied to CORESET #0 (i.e., 480 kHz).
  2) Ratio of the number of payload bits of CORESET #0 to the number of payload bits of SIB1. For example, more symbols may be allocated for the one with larger number of payload bits.
  3) Indication in PBCH. For example, pdcch-ConfigSIB1 may be reused.
  4) Indication by SSB index By arranging SSB, CORESET #0, and SIB1 as illustrated in FIG. 18, there is no need for the beam switching between the SSB and the CORESET #0 and SIB1, and the delay related to decoding of SIB1 can be reduced.

Note that, as an arrangement example of SSB and RMSI, in FIG. 18, SSB may be arranged from symbol #0 to symbol #3, and, CORESET #0 symbols from symbol #0 to symbol 23 and SIB1 symbols from symbol #24 to symbol #31 may be frequency-multiplexed with the SSB.

In addition, as an arrangement example of SSB an RMSI, in FIG. 18, SSB may be arranged from symbol #0 to symbol #3, and may be frequency-multiplexed with CORESET #0 symbols from symbol #0 to symbol #23, and SIB1 is not required to be frequency-multiplexed with SSB, and may be arranged from symbol #32 to symbol #63. In addition, CORESET #0 may be arranged from symbols #0 to #31.

According to the above-described embodiments, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1.

That is, initial access can be performed in accordance with frequency bands in a wireless communication system.
(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.
<Base Station 10>

Figure 19:
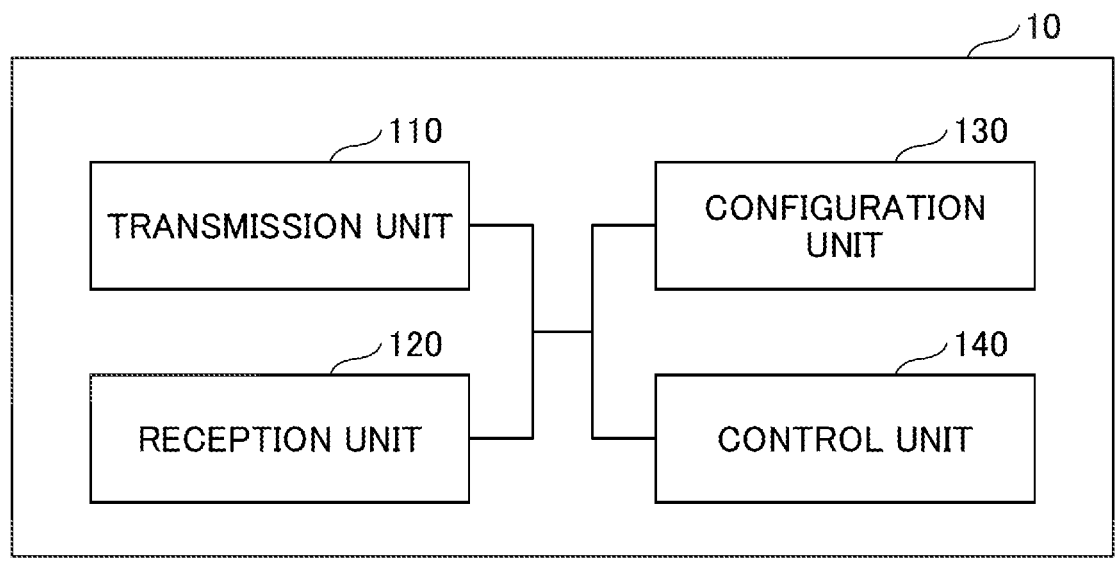
FIG. 19 is a drawing illustrating an example of a functional structure of a base station 10 in an embodiment of the present invention.

FIG. 19 is a drawing illustrating an example of a functional structure of a base station 10 according to an embodiment of the present invention. As shown in FIG. 19, the base station 10 includes a transmission unit 110, a reception unit 120, a configuration unit 130, and a control unit 140. The functional structure illustrated in FIG. 19 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to the initial access.

The control unit 140 performs control related to the initial access as described in the embodiments. In addition, the control unit 140 performs scheduling. The functional units related to signal transmission in the control unit 140 may be included in the transmission unit 110, and the functional units related to signal reception in the control unit 140 may be included in the reception unit 120.

<Terminal 20>

Figure 20:
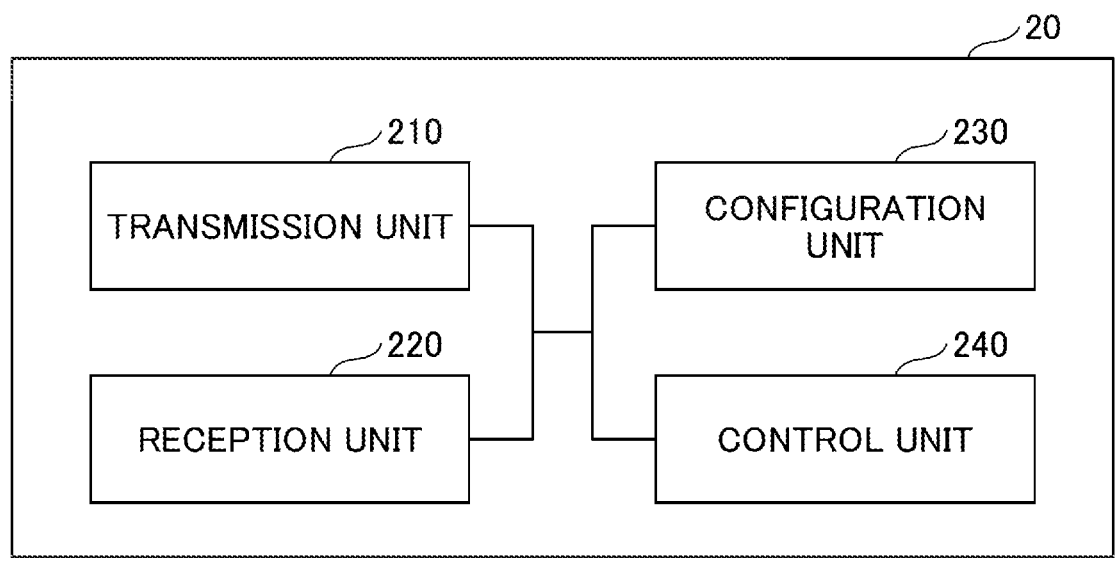
FIG. 20 is a drawing illustrating an example of a functional structure of a terminal 20 in an embodiment of the present invention.

FIG. 20 is a drawing illustrating an example of a functional structure of a terminal 20 according to an embodiment of the present invention. As shown in FIG. 20, the terminal 20 includes a transmission unit 210, a reception unit 220, a configuration unit 230, and a control unit 240. The functional structure illustrated in FIG. 20 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information items received by the reception unit 220 from the base station 10. In addition, the configuration unit 230 also stores pre-configured configuration information. Contents of the configuration information are, for example, information related to the initial access.

The control unit 240 performs control related to the initial access as described in the embodiments. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 19 and FIG. 20), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 21:
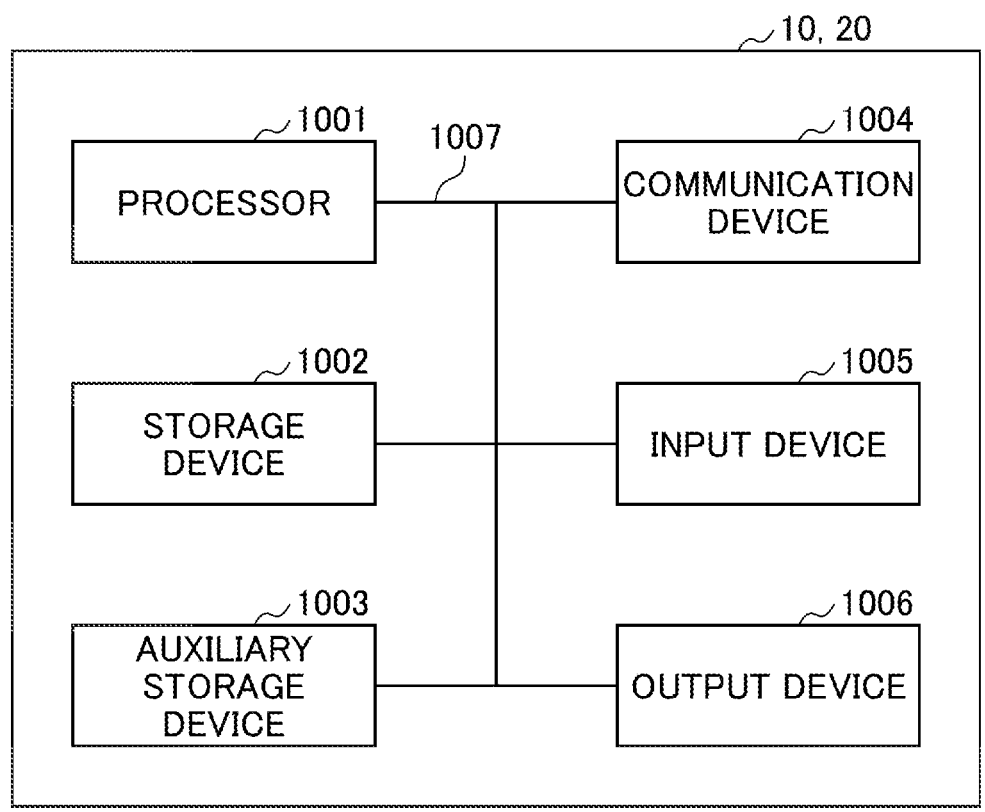
FIG. 21 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 21 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 19 may be realized by control programs that are stored in the storage device 1002 and are executed by the processor 1001. Further, for example, the control unit 240 of the terminal 20 illustrated in FIG. 20 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disc), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be 50 physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit configured to receive a block including a synchronization signal and a broadcast channel, a control channel carrying control information, and a shared channel carrying system information by applying single beamforming; and a control unit configured to perform an initial access, based on the system information. The block and at least one of the control channel and the shared channel are frequency-multiplexed, and the control channel and the shared channel are time-multiplexed.

According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1. That is, initial access can be performed in accordance with frequency bands in a wireless communication system.

The block and both the control channel and the shared channel may be frequency-multiplexed, and a subcarrier spacing of the block may be four times or eight times a subcarrier spacing of the control channel and the shared channel. According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1.

The block and the shared channel may be frequency-multiplexed, the block and the control channel are not required to be frequency-multiplexed, and a subcarrier spacing of the block may be four times or eight times a subcarrier spacing of the control channel and the shared channel. According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1.

A time domain resource allocated to the control channel and a time domain resource allocated to the shared channel may be determined based on a slot boundary of the block or a ratio between a payload of the control channel and a payload of the control channel. According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1.

As described above, according to an embodiment of the present invention, a base station is provided. The base station includes: a transmission unit configured to transmit a block including a synchronization signal and a broadcast channel, a control channel carrying control information, and a shared channel carrying system information by applying single beamforming; and a control unit configured to perform an initial access, based on the system information. The block and at least one of the control channel and the shared channel are frequency-multiplexed, and the control channel and the shared channel are time-multiplexed.

According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1. That is, initial access can be performed in accordance with frequency bands in a wireless communication system.

In addition, according to an embodiment of the present invention, a communication method performed by a terminal is provided. The communication method includes: receiving a block including a synchronization signal and a broadcast channel, a control channel carrying control information, and a shared channel carrying system information by applying single beamforming; and performing an initial access, based on the system information. The block and at least one of the control channel and the shared channel are frequency-multiplexed, and the control channel and the shared channel are time-multiplexed.

According to the above configuration, in a case where communications are performed in a frequency band to which SCS larger than the conventional SCS is applied, the base station 10 and the terminal 20 can arrange SSB, CORESET #0, and SIB1 in the radio resources by considering the latency related to decoding of SIB1, the beam switching, the SMTC window size, the frequency resource allocation, and the like. In addition, the base station 10 and the terminal 20 can flexibly allocate symbols to CORESET #0 and SIB1. That is, initial access can be performed in accordance with frequency bands in a wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth 50 (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1)

represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station Apparatus", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and non-visible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a subslot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in a RB may be the same, regardless of the numerology, and may be 12, for example. The number of subcarriers included in a RB may be determined on the basis of numerology.

Further, the time domain of a RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that, in the present disclosure, SSB is an example of a block including a synchronization signal and a broadcast channel.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:
a reception unit configured to receive a synchronization signal block including a synchronization signal and a broadcast channel; and
a control unit configured to perform a random access procedure based on system information received via the synchronization signal block, wherein
the reception unit receives at least one of two synchronization signal blocks that are arranged at predetermined symbol positions of each slot in a frequency band to which a subcarrier spacing that is equal to or greater than 480 kHz is applied.

2. The terminal as claimed in claim 1, wherein
the two synchronization signal blocks are arranged across consecutive 32 slots.

3. A communication method performed by a terminal, the communication method comprising:
receiving at least one of two synchronization signal blocks that are arranged at predetermined symbol positions of each slot in a frequency band to which a subcarrier spacing that is equal to or greater than 480 kHz is applied; and
performing a random access procedure based on system information received via the synchronization signal block, wherein
the synchronization signal block includes a synchronization signal and a broadcast channel.

4. A base station comprising:
a transmission unit configured to transmit a synchronization signal block including a synchronization signal and a broadcast channel; and
a control unit configured to expect that a terminal is to perform a random access procedure based on system information transmitted via the synchronization signal block, wherein
the transmission unit transmits two synchronization signal blocks that are arranged at predetermined symbol positions of each slot in a frequency band to which a subcarrier spacing that is equal to or greater than 480 kHz is applied.

5. A communication system comprising: a terminal; and a base station, wherein
the terminal includes:
a reception unit configured to receive a synchronization signal block including a synchronization signal and a broadcast channel from the base station; and
a control unit configured to perform a random access procedure for accessing the base station based on system information received via the synchronization signal block, wherein
the reception unit receives at least one of two synchronization signal blocks that are arranged at predetermined symbol positions of each slot in a frequency band to which a subcarrier spacing that is equal to or greater than 480 kHz is applied from the base station, and
the base station includes:
a transmission unit configured to transmit the synchronization signal block to the terminal; and a control unit configured to expect that the terminal is to perform a random access procedure based on the system information, wherein
the transmission unit transmits the two synchronization signal blocks to the terminal in the frequency band.

* * * * *